United States Patent [19]

Linscott

[11] Patent Number: 5,599,103
[45] Date of Patent: Feb. 4, 1997

[54] MILKSHAKE MIXER BLADE

[76] Inventor: William D. Linscott, 4877 Grange Rd., Santa Rosa, Calif. 95404

[21] Appl. No.: 644,117

[22] Filed: May 10, 1996

[51] Int. Cl.⁶ ....................................................... B01F 7/16
[52] U.S. Cl. ........................ 366/343; 241/292.1; 416/237
[58] Field of Search ............................... 366/64, 65, 197, 366/198, 205, 314, 342, 343; 241/282.1, 282.2, 292.1; 416/237

[56] References Cited

U.S. PATENT DOCUMENTS

| | | |
|---|---|---|
| 167,493 | 9/1875 | Bright et al. .............................. 366/343 |
| 579,668 | 3/1897 | Wilson . |
| 1,582,518 | 4/1926 | Horrell ..................................... 416/237 |
| 3,069,144 | 12/1962 | Patten ...................................... 366/343 |

*Primary Examiner*—Charles E. Cooley
*Attorney, Agent, or Firm*—Larry D. Johnson

[57] ABSTRACT

An improved mixing blade which can be substituted for mixing blades of existing milkshake machines, including a generally planar body portion having a central aperture for attachment to a mixer shaft, the body portion terminating in a pair of opposed straight edge portions each having an upturned tab element along at least one end thereof, and a pair of curved edge portions each having a downturned skirt along their entire length.

3 Claims, 2 Drawing Sheets

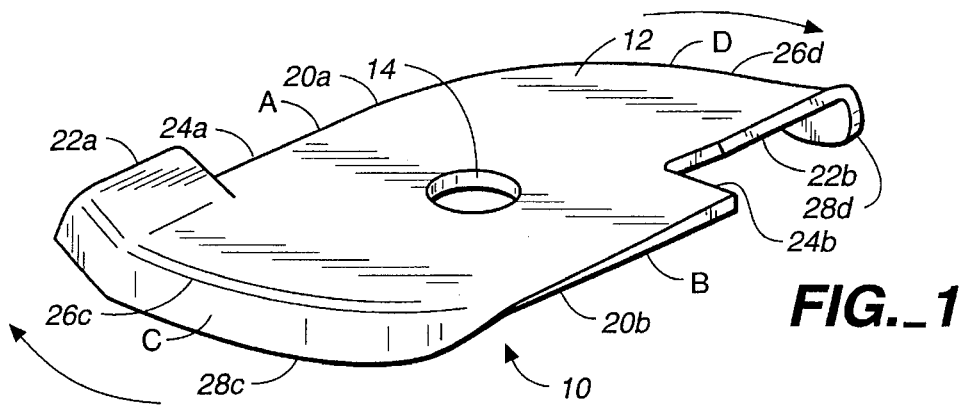
FIG._1
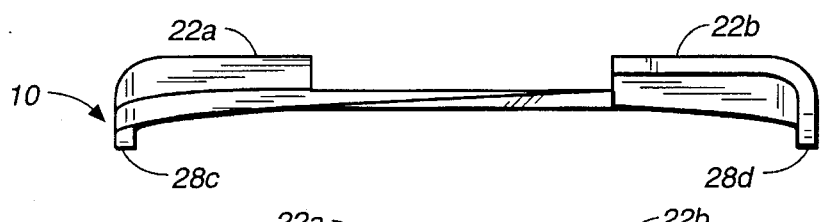
FIG._2
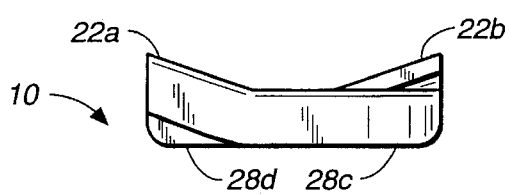
FIG._3
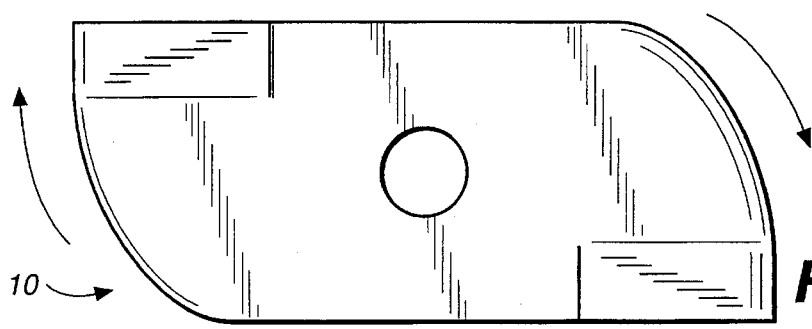
FIG._4
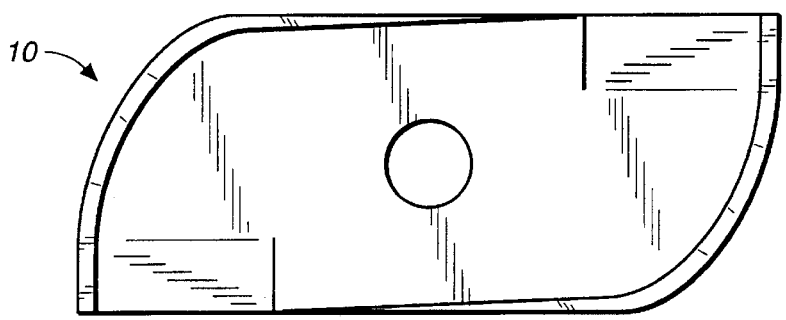
FIG._5

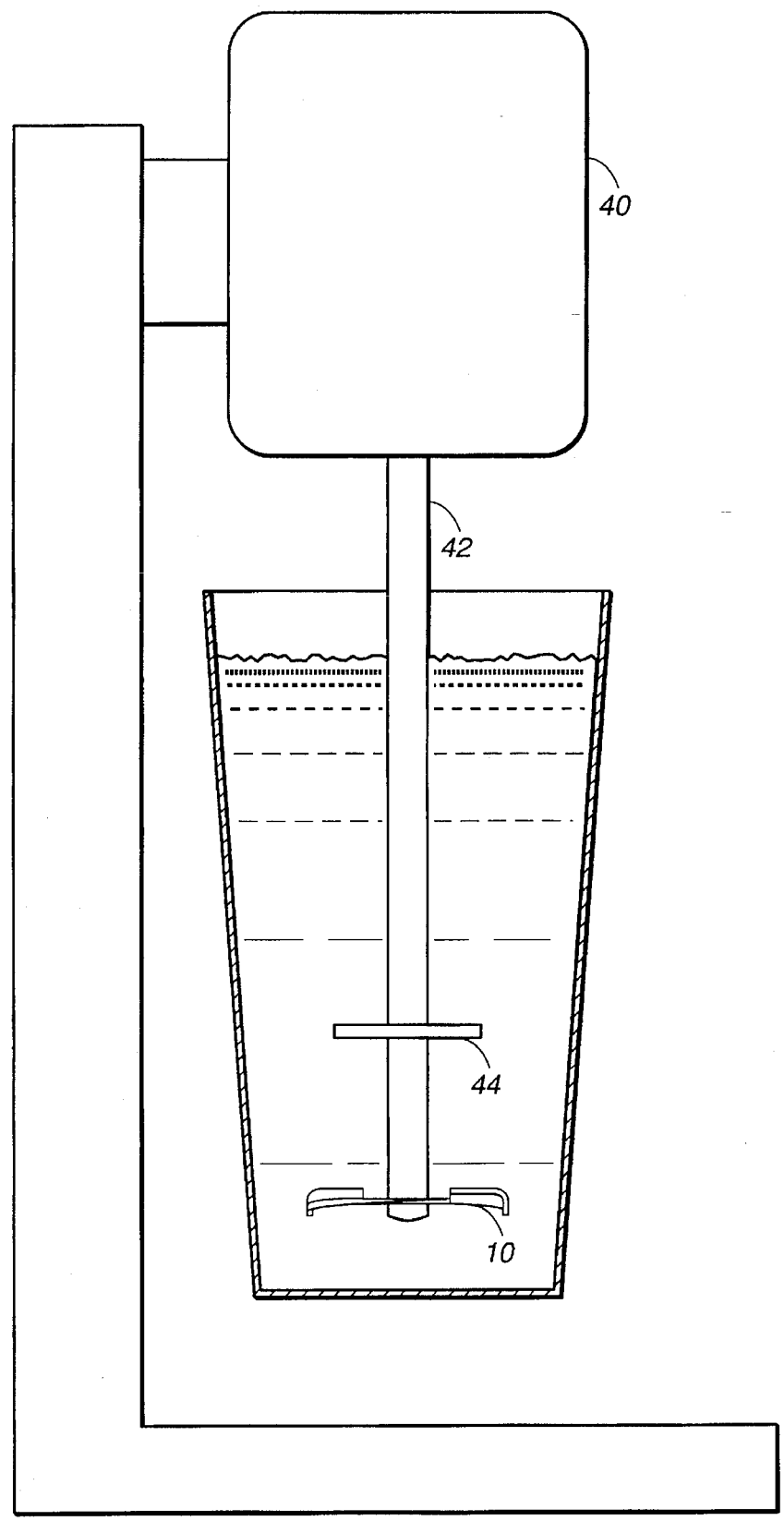
FIG._6

MILKSHAKE MIXER BLADE

BACKGROUND OF THE INVENTION

1. Field of the Invention

This invention relates generally to food processing equipment, and more specifically to electric drink mixers, particularly those used to make milkshakes.

2. Description of the Prior Art

Known milkshake mixers currently in use consist basically of an electric motor mounted on a stand, with a downwardly-dependent rotating shaft to which is affixed at least one and typically two disk-shaped mixing blades (the upper of which is usually press-fit onto the shaft, while the lower blade is typically screwed on to the bottom of the shaft). These mixing blades have a rippled edge, which creates turbulence as they rotate, thereby mixing the milk, ice cream and other ingredients within the milkshake canister.

However, the amount of turbulence produced by these blades of the prior art is insufficient to do either a rapid or thorough job of blending the milk and chunks of ice cream which are the ingredients of most milkshakes. As a result, an attendant must continually manipulate the milkshake canister up and down and back and forth relative to the rotating shaft and blades in order to achieve a thorough mixing of the ingredients. When hard ice cream is used, this process can take five or six minutes or more, during which time the attendant is occupied with this procedure and therefore not free to deal with other customers or their orders. Despite this aggravating and time-consuming process, the end result is often a milkshake still containing lumps of ice cream, and if the ice cream contained bits of ice to begin with (as is not uncommon), these bits of ice are also still present in the final product.

SUMMARY OF THE INVENTION

The milkshake mixer blade of the present invention provides an improved mixing blade which can easily be substituted for mixing blades of the prior art, thereby converting today's slow, inefficient milkshake machines, requiring constant attention, into highly efficient mixers which can produce a smooth, completely blended milkshake in two minutes or less, with no manual agitation. The inventive blade includes a generally planar body portion having a central aperture for attachment to a mixer shaft, the body portion terminating in a pair of opposed straight edge portions each having an upturned tab element along at least one end thereof, and a pair of curved edge portions each having a downturned skirt along their entire length, such that the respective edge portions define reversed mirror images of each other relative to an axis drawn through the central aperture.

The inventive blade achieves its superior results by creating a vigorous rotating double-torus flow pattern within the milkshake canister, with a vortex superimposed from the top down. Since the inventive blade is designed to preferably replace only the lower of the two disk-like mixing blades usually present on current milkshake machines, the following description will refer to "blades" in the plural:

The fluid flow patterns created by the combined actions of the two blades blend together into one highly efficient mixing stream. As fluid is thrown radially outward (centrifugally) by the rotating blades, part of the fluid is deflected spirally downward by the tapered wall of the milkshake canister. When it reaches the bottom of the canister, this circular and downward flow spirals in toward the center, and then upward and outward once again. The portion of the rotating mixture which is not deflected downward by the canister wall is deflected circularly upward instead. When the fluid reaches the top of the fluid column, it is sucked radially inward (centripetally) into the vortex created by the whirling blades. Along with entrained air, the fluid then moves downward to the blades, and is thrown outward once again. This vigorous flow pattern, which is made increasingly turbulent by entrained air as the speed of rotation rises, includes the entire liquid volume of the mixing canister, and is responsible for the rapid and thorough blending which is achieved by the present invention. This flow pattern is enhanced by both the up-turned tabs and the down-turned skirts of the inventive blade design.

BRIEF DESCRIPTION OF THE DRAWINGS

FIG. 1 is an upper frontal left perspective view of a milkshake mixer blade of this invention, illustrating its generally planar body portion bearing a central aperture for attachment to a mixer shaft (not shown), the body portion terminating in a pair of opposed straight edge portions each bearing an upturned tab element along only one end of each of the straight edge portions, and a pair of curved edge portions each bearing a downturned skirt along the entire lengths of the curved edge portions;

FIG. 2 is a front elevation view of the milkshake mixer blade of this invention;

FIG. 3 is a right side elevation view of the milkshake mixer blade of this invention;

FIG. 4 is a top plan view of the milkshake mixer blade of this invention;

FIG. 5 is a bottom plan view of the milkshake mixer blade of this invention; and FIG. 6 is a schematic side elevation view of a typical milkshake mixer apparatus in operation with the milkshake mixer blade of this invention installed on a downwardly-depending mixing shaft some distance beneath a prior art mixing blade.

DETAILED DESCRIPTION OF A PREFERRED EMBODIMENT

FIG. 1 is an upper frontal left perspective view of a milkshake mixer blade 10 of this invention, illustrating its generally planar body portion 12 bearing a central aperture 14 for attachment to a mixer shaft (not shown). The body portion 12 is generally defined by four sides A, B, C and D as follows: the body portion terminates in a pair of opposed straight edge portions 20a, 20b each bearing an upturned tab element 22a, 22b adjacent only one end 24a, 24b of each of the straight edge portions 20a, 20b. The body portion 12 is further defined by and terminates in a pair of curved edge portions 26c, 26d each bearing a downturned skirt element 28c, 28d along the entire lengths of the curved edge portions, such that the respective edge portions 20a, 20b and 26c, 26d define reversed mirror images of each other relative to an axis drawn through the central aperture 14. The arrows indicate the preferred direction of rotation of the blade when installed.

FIG. 2 is a front elevation view of the milkshake mixer blade 10 of this invention, while FIG. 3 is a right side elevation view of the milkshake mixer blade 10 of this invention. These views illustrate the symmetrical relationship of the upturned tab elements 22a, 22b and downturned skirt elements 28c, 28d. Tab elements 22a, 22b are preferably approximately one-third the length of the straight edge itself.

FIG. 4 is a top plan view of the milkshake mixer blade 10 of this invention, while FIG. 5 is a bottom plan view of the milkshake mixer blade 10 of this invention.

FIG. 6 is a schematic side elevation view of a typical milkshake mixer apparatus 40 in operation with the milkshake mixer blade 10 of this invention installed on a downwardly-depending mixing shaft 42 some distance beneath a prior art mixing blade 44.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and their legal equivalents.

What is claimed as invention is:

1. A mixer blade for a milkshake machine having a downwardly-depending motor shaft, said mixer blade comprising:

a generally planar body portion having a central aperture for attachment to the motor shaft, said body portion terminating in a pair of opposed straight edge portions each having an upturned tab element along an end thereof, and a pair of curved edge portions each having a downturned skirt along their entire length.

2. The mixer blade for a milkshake machine of claim 1 wherein said straight edge portions have a length, and said upturned tab elements have a length approximately one-third of said straight edge portion length.

3. A method for improving a milkshake machine, said milkshake machine having a downwardly-depending motor shaft and at least one mixing blade, said method comprising the steps of:

replacing said at least one mixing blade with a mixing blade having a generally planar body portion having a central aperture for attachment to the motor shaft, said body portion terminating in a pair of opposed straight edge portions each having an upturned tab element along an end thereof, and a pair of curved edge portions each having a downturned skirt along their entire length.

* * * * *